United States Patent
Levit et al.

(10) Patent No.: US 9,972,311 B2
(45) Date of Patent: May 15, 2018

(54) LANGUAGE MODEL OPTIMIZATION FOR IN-DOMAIN APPLICATION

(71) Applicant: MICROSOFT CORPORATION, Redmond, WA (US)

(72) Inventors: Michael Levit, San Jose, CA (US); Sarangarajan Parthasarathy, Mountain View, CA (US); Andreas Stolcke, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 14/271,962

(22) Filed: May 7, 2014

(65) Prior Publication Data

US 2015/0325235 A1    Nov. 12, 2015

(51) Int. Cl.
*G10L 15/06* (2013.01)
*G10L 15/18* (2013.01)
*G06F 17/27* (2006.01)

(52) U.S. Cl.
CPC ............ *G10L 15/18* (2013.01); *G06F 17/278* (2013.01); *G06F 17/2715* (2013.01)

(58) Field of Classification Search
CPC .............................. G06F 17/27; G10L 15/187
See application file for complete search history.

(56) References Cited

U.S. PATENT DOCUMENTS

| | | |
|---|---|---|
| 6,415,248 B1 | 7/2002 | Bangalore et al. |
| 6,754,626 B2 | 6/2004 | Epstein |
| 7,392,186 B2 | 6/2008 | Duan et al. |

(Continued)

FOREIGN PATENT DOCUMENTS

| | | |
|---|---|---|
| EP | 1582998 A2 | 10/2005 |
| WO | 0031727 A1 | 6/2000 |

OTHER PUBLICATIONS

Deligne, S., & Bimbot, F. (May 1995). Language modeling by variable length sequences: Theoretical formulation and evaluation of multigrams. In Acoustics, Speech, and Signal Processing, 1995. ICASSP-95., 1995 International Conference on (vol. 1, pp. 169-172). IEEE.*

(Continued)

*Primary Examiner* — Shreyans Patel
(74) *Attorney, Agent, or Firm* — Shook, Hardy & Bacon L.L.P.

(57) ABSTRACT

Systems and methods are provided for optimizing language models for in-domain applications through an iterative, joint-modeling approach that expresses training material as alternative representations of higher-level tokens, such as named entities and carrier phrases. From a first language model, an in-domain training corpus may be represented as a set of alternative parses of tokens. Statistical information determined from these parsed representations may be used to produce a second (or updated) language model, which is further optimized for the domain. The second language model may be used to determine another alternative parsed representation of the corpus for a next iteration, and the statistical information determined from this representation may be used to produce a third (or further updated) language model. Through each iteration, a language model may be determined that is further optimized for the domain.

19 Claims, 6 Drawing Sheets

(56) References Cited

U.S. PATENT DOCUMENTS

| | | | |
|---|---|---|---|
| 7,478,038 | B2 | 1/2009 | Chelba et al. |
| 7,739,286 | B2 | 6/2010 | Sethy et al. |
| 7,813,926 | B2 | 10/2010 | Wang et al. |
| 7,835,911 | B2 | 11/2010 | Balchandran et al. |
| 8,374,871 | B2 | 2/2013 | Ehsani et al. |
| 8,447,608 | B1 | 5/2013 | Chang et al. |
| 2004/0210434 | A1* | 10/2004 | Wang ............... G06F 17/274 704/9 |
| 2004/0249628 | A1 | 12/2004 | Chelba et al. |
| 2005/0228667 | A1 | 10/2005 | Duan et al. |
| 2008/0215311 | A1 | 9/2008 | Chelba et al. |
| 2009/0006092 | A1 | 1/2009 | Miki et al. |
| 2014/0372119 | A1* | 12/2014 | Parada ............ G06F 17/30899 704/246 |
| 2015/0088511 | A1* | 3/2015 | Bharadwaj .......... G10L 15/187 704/244 |
| 2015/0287405 | A1 | 10/2015 | Biadsy et al. |

OTHER PUBLICATIONS

Watkins, et al., "Methods for Creating a Phrase Thesaurus," In: 10th Annual Conference of the International Speech Communication Association (Interspeech), Sep. 6, 2009, 4 pages.

McGraw, et al., "Automating Crowd-supervised Learning for Spoken Language Systems," In Proceedings of 13th Annual Conference of the International Speech Communication Association, Sep. 9, 2012, 4 pages.

Deligne, et al., "Language Modeling by Variable Length Sequences: Theoretical Formulation and Evaluation of Multigrams", International Conference on Acoustics, Speech and Signal Processing, May 9, 1995, pp. 169-.172.

"International Search Report and Written Opinion Issued in PCT Application No. PCT/US2015/029658", dated Aug. 27, 2015, 13 Pages.

International Preliminary Report on Patentability dated Jul. 20, 2016 for International Patent Application No. PCT/US2015/029658, 16 pages.

Michael Levit, Sarangarajan Parthasarathy, Shuangyu Chang, Andreas Stolcke, and Benoit Dumoulin, Word-Phrase-Entity Language Models: Getting More Mileage out of N-grams, in Proc. Interspeech, ISCA—International Speech Communication Association, Singapore, Sep. 15, 2014.

Dempster, et al., "Maximum Likelihood from Incomplete Data via the EM Algorithm", In Journal of the Royal Statistical Society. Series B (Methodological), vol. 39, No. 1, Retrieved on: Oct. 1, 2014, 39 pages.

Stolcke, Andreas, "An Efficient Probabilistic Context-Free Parsing Algorithm that Computes Prefix Probabilities", In Journal of Computational Linguistics, vol. 21, Issue 2, Jun. 1995, 36 pages.

Stolcke, Andreas, "SRILM—An Extensible Language Modeling Toolkit", In Proceedings of 7th International Conference on Spoken Language Processing, Sep. 16, 2002, 4 pages.

Liu, et al., "Use of Contexts in Language Model Interpolation and Adaptation", In Proceedings of Computer Speech & Language, vol. 27, No. 1, Jan. 2013, 22 pages.

Liu, et al., "Use of Contexts in Language Model Interpolation and Adaptation", In Technical Report 630, Feb. 2009, 23 pages.

Ballinger, et al., "On-Demand Language Model Interpolation for Mobile Speech Input", In Proceedings of 11th Annual Conference of the International Speech Communication Association, Sep. 26, 2010, 4 pages.

Liu, et al., "Context Dependent Language Model Adaptation", In Proceedings of 9th Annual Conference of the International Speech Communication Association, Sep. 22, 2008, 4 pages.

Saluja, et al., "Context-aware Language Modeling for Conversational Speech Translation", In Proceedings of Machine Translation Summit XIII, Sep. 2011, 8 pages.

Bisazza, et al., "Class-Based Language Modeling for Translating into Morphologically Rich Languages", In Proceedings of the 25th International Conference on Computational Linguistics, Aug. 23, 2014, 10 pages.

Moore, et al., "Class-Based Language Model Adaptation using Mixtures of Word-Class Weights", In Proceedings of 6th International Conference of Spoken Language Processing, Oct. 16, 2000, 8 pages.

Haidar, et al., "Interpolated Dirichlet Class Language Model for Speech Recognition Incorporating Long-distance N-grams", In Proceedings of the 25th International Conference on Computational Linguistics, Aug. 23, 2014, 10 pages.

Liang, et al., "Language Model Adaptation Based on the Classification of a trigram's Language Style Feature", In Proceedings of IEEE International Conference on Natural Language Processing and Knowledge Engineering, Oct. 30, 2005, 6 pages.

Liu, et al., "Context Dependent Language Model Adaptation", In Proceedings of 9th Annual Conference of the International Speech Communication Association, Sep. 14, 2008, 15 pages.

Yokoyama, et al., "Unsupervised Language Model Adaptation Using Word Classes for Spontaneous Speech Recognition", In Proceedings IEEE-ISCA Workshop on Spontaneous Speech Processing and Recognition, Apr. 13, 2003, 4 pages.

Hsu, Bo-June (Paul), "Generalized Linear Interpolation of Language Models", In Proceedings of Workshop on Automatic Speech Recognition and Understanding, Dec. 9, 2007, 5 pages.

Sak, et al., "On-the-fly Lattice Rescoring for Real-time Automatic Speech Recognition", In Proceedings of 11th Annual Conference of the International Speech Communication Association, Sep. 26, 2010, 4 pages.

Ng, et al., "Adaptation of Lecture Speech Recognition System with Machine Translation Output", In Proceedings of IEEE International Conference on Acoustics, Speech and Signal Processing, May 26, 2013, 5 pages.

Non-Final Office Action dated Jun. 30, 2016 in U.S. Appl. No. 14/644,976, 15 pages.

Notice of Allowance dated Apr. 19, 2017 in U.S. Appl. No. 14/644,976, 10 pages.

"Second Written Opinion Issued in PCT Application No. PCT/US2016/021416", dated Jan. 25, 2017, 8 Pages.

Final Office Action dated Dec. 13, 2016 in U.S. Appl. No. 14/644,976, 12 pages.

"Second Written Opinion Issued in PCT Application No. PCT/US2015/029658", dated Mar. 24, 2016, 6 Pages.

Chen, et al., "Adapted Language Modeling for Recognition of Retelling Story in Language Learning", International Conference on Audio, Language and Image Processing (ICALIP), IEEE, Jul. 16, 2012, 5 Pages.

Levit, et al., "Token-Level Interpolation for Class-Based Language Models", International Conference on Acoustics, Speech and Signal Processing (ICASSP), IEEE, Apr. 1, 2015, 5 Pages.

"International Search Report and Written Opinion Issued in PCT Application No. PCT/US2016/021416", dated Apr. 29, 2016, 15 Pages.

* cited by examiner

LANGUAGE MODEL OPTIMIZATION FOR IN-DOMAIN APPLICATION

BACKGROUND

Automatic speech recognition (ASR) uses language models for determining plausible word sequences for a given language or application domain. The prevailing approaches to ASR typically use discrete words (n-grams) as the basic units of language modeling. But these approaches are limited to relatively short memory spans and an inability to efficiently generalize from limited training data.

Attempts to mitigate these weaknesses include casting named entities as a class, in a class-based language model (LM), where the classes may be automatically inferred or manually defined, and in some cases, employing common cohesive word strings for improving post-recognition tasks, such as machine translation, information extraction, and language understanding. However, such methods are inefficient, contextually unaware, or otherwise do not preserve the simplicity and scalability of n-gram language models. Moreover, approaches using larger-span units or multi-word units in addition to discrete words promise improvement, especially for applications that are domain-constrained.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention are directed towards systems and methods for determining and optimizing language models by way of iterative processes that express training material as alternative representations of higher-level units, such as named entities and carrier phrases. In particular, embodiments automatically determine representations or "parses" of a training corpus as multi-word named entities, phrases, including carrier phrases, and words. These representations are used to produce an LM optimized for the corpus domain, which is class based in terms of named entities and contains the phrases as independent pseudo-words. Thus, embodiments of the invention provide a single unified and unsupervised language-modeling approach that combines the discriminative power of words, the generalizing power of classes, and the context modeling power of common phrases. Such LMs offer significant improvements in speech recognition and understanding, machine translation, and other tasks where LMs are used.

As will be further described, in one embodiment, an iterative optimization algorithm is employed for expressing a word-level corpus of training material in terms of "tokens" (unit n-grams) representing words, entities, or phrases. An LM is used to parse the training corpus into sequences of tokens. From the parsed representations of the training corpus, token n-gram probabilities are determined, thereby updating (or retraining) the LM. A maximum likelihood solution may be determined with respect to all possible parses that can account for input sequences. The updated LM is used to determine alternative parsed representations of the corpus for a next iteration, and the probabilities determined from these alternative parsed representations are used to update (retrain) the LM again. Thus, with each iteration, alternative parsed representations of the training corpus are determined using the LM, and the LM is updated to reflect the token n-gram probabilities determined from the parsed representations determined in that iteration. In this manner, each iteration results in an LM that is further optimized for the corpus domain. Some embodiments further include optimizing entity definitions in a similar manner.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
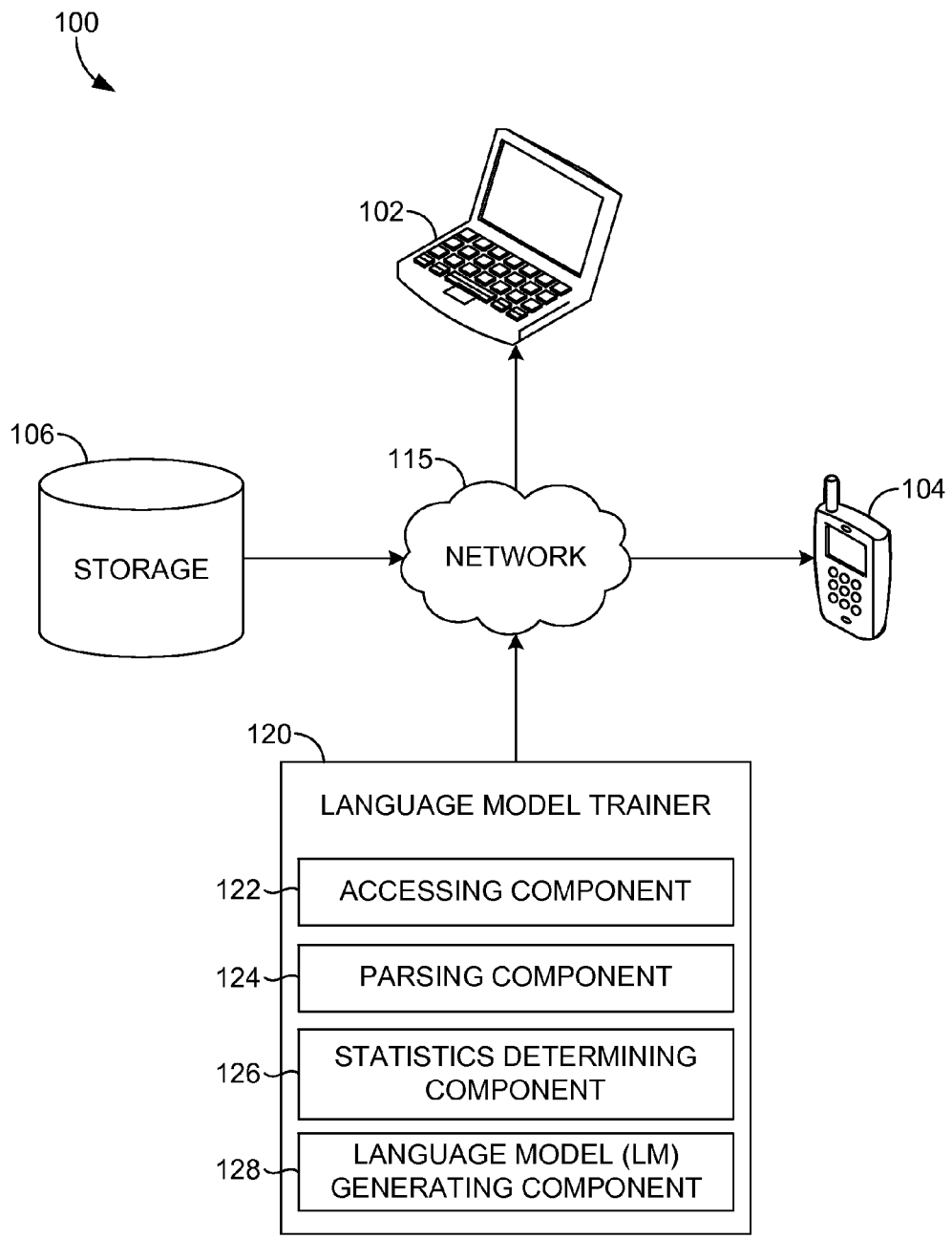
FIG. 1 is a block diagram of an example system architecture in which an embodiment of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are directed towards systems, methods, and computer storage media for, among other things, determining and optimizing language models for in-domain applications. In embodiments of the invention, language models may be optimized through an iterative, joint-modeling approach that expresses in-domain training material as alternative representations of higher-level units, such as named entities and carrier phrases. In particular, embodiments automatically determine representations or "parses" of a training corpus as multi-word named entities, phrases including carrier phrases, and words. These representations are used to produce an LM optimized for the training corpus domain, which is class based in terms of named entities and contains the phrases as independent pseudo-words. Thus, embodiments of the invention provide a single unified and unsupervised language-modeling approach by combining the words, phrases, and entities into a language model wherein the words, phrases, and named entities coexist in the same probability space.

Optimized LMs created by embodiments of the invention offer significant improvements in speech recognition and understanding, machine translation, and other tasks where LMs are used. For example, these LMs are typically more compact, thereby improving efficiency. Additionally, they are capable of providing efficient decoding even for classes with large numbers of entities, unsupervised (or lightly supervised, in some embodiments) extraction of entities and carrier phrases, alleviating the need for large tagged corpora, and a mechanism for incorporating domain constraints during recognition, thereby improving the quality of input for downstream processing such as understanding. Further, such models facilitate staying updated as specific instances of entity-types change. For example, if a new movie comes out, only the definition of the movie entity class may need updating; the LM is capable of recognizing the movie and information related to the movie. Still further, these models facilitate analysis of the nature of the application domain, such as determining typical contexts of the entities (e.g., what words or phrases is the movie entity-type typically surrounded by).

As used herein, the term "token" (or unit) means one or more words, a phrase, or an entity. For example, consider the sentence, "I would like to follow Angelina Jolie on Twitter." (Capitalization or italics may be included in some instances herein for reading ease.) The phrase "I would like to" could include four or less tokens (e.g., one token for each word, tokens representing 2 or more words, or one token representing all four words). Similarly, "Angelina Jolie" could be two word tokens (for the words "Angelina" and "Jolie"), one entity token, or one phrase token (representing the phrase "Angelina Jolie"). A phrase token associated with an entity may be referred to as a carrier phrase. As used herein, the term "parse," as a noun, refers to a sequence of one or more tokens that represents a corpus.

Accordingly, at a high level, an iterative optimization algorithm is employed for expressing a word-level corpus of training material in terms of "tokens" (or unit n-grams) representing words, entities, or phrases, in an embodiment of the invention. An LM is used to parse the training corpus into sequences of these tokens. From these parsed representations of the training corpus, token n-gram probabilities are determined, thereby updating (retraining) the LM. In one embodiment, a maximum likelihood solution is determined with respect to the parses. The updated LM is used to determine alternative parsed representations of the corpus for a next iteration, and the probabilities determined from these alternative parsed representations are used to update (retrain) the LM again.

With each iteration, alternative parsed representations of the training corpus are determined using the LM, and the LM is updated to reflect the token n-gram probabilities determined from the parsed representations determined in that iteration. In this way, the same sequences of words from the training corpus may be modeled as, for example, part of a carrier phrase in one representation, separate words in another representation, or a named entity in yet another representation. Each iteration results in an LM that is further optimized for the domain of the training corpus. Some embodiments further include optimizing the entity definitions in a similar manner, as further described herein. In an embodiment, the iterations proceed until convergence or until the LM is deemed satisfactory, at which point the LM may be provided, or the final corpus representation may be used to train an entity-class-based language model for the application domain, with common carrier phrases encoded as new pseudo-words.

For example, consider the word-level text, "i'd like to see movie up in the air in amc sixteen and then go home," which represents an in-domain corpus, for purposes of the example. For the sake of clarity, this example corpus includes only one sentence, but it is contemplated that corpora used by embodiments of the invention may comprise many words or sentences. One embodiment of the invention might represent this corpus as "i'd+like+to see movie <movie> in <theater> and then go+home." This example parse of the corpus represents the original word-level corpus as a sequence of tokens including phrase tokens "i'd+like+to" and "go+home;" word tokens "see," "movie," "in," "and," and "then;" and entity tokens for a movie entity-type and a theatre entity-type. Using this example parse for training an LM results in a class-based model that has classes but also includes phrases encoded as new pseudo-words.

As described above, an embodiment of the invention provides an iterative, unsupervised approach, referred to herein as an algorithm or learner, for determining and optimizing an LM for in-domain applications. The learner can be unsupervised because it performs automatically and does not require supervised training. For example, in one embodiment, the only input for the learner includes an in-domain corpus of words and some definitions of entities. The learner is iterative because it can perform a series of iterations to determine an optimized LM, wherein each iteration uses an LM produced in a previous iteration to determine parsed representations of the corpus.

Thus, a goal of the learner is to produce a representation of the original corpus in terms of tokens (parsed words, phrases, and entities). From the representation of tokens, statistics associated with the tokens and words within the tokens may be determined and used to update or retrain the LM, in an embodiment. The statistics may include frequency, occurrence, proximity, and/or other probabilities associated with the tokens and words within the tokens. The updated LM, which may be considered a new or retrained LM, may be used then to re-express the original corpus into alternative representations of tokens, which may then be used to generate an updated LM in a subsequent iteration. Each iteration produces an LM that is further tailored to the domain of the corpus. In this sense, the learner performs as an Expectations Maximization algorithm, wherein determining parses corresponds to the expectation step and generating the updated LM, by estimating probabilities associated with the tokens of the parse, corresponds to the maximization step.

Turning now to FIG. 1, a block diagram is provided showing aspects of an example system architecture suitable for implementing an embodiment of the invention and designated generally as system 100. It should be understood that this and other arrangements described herein are set forth only as examples. Thus, system 100 represents only one example of a suitable computing system architecture. Other arrangements and elements (e.g., user devices, data stores, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, system 100 includes network 115 communicatively coupled to one or more user devices (e.g., items 102 and 104), storage 106, and language model trainer 120. The components shown in FIG. 1 may be implemented using one or more computing devices, such as computing device 600 described in connection to FIG. 6. Network 115 may include, without limitation, one or more local area networks (LANs) and/or wide area networks (WANs). Such networking environments are commonplace in offices, enterprise-wide computer networks, intranets, and the Internet. It should be understood that any number of user devices, storage components, and language model trainers may be employed within the system 100 within the scope of the present invention. Each may comprise a single device or multiple devices cooperating in a distributed environment. For instance, language model trainer 120 may be provided via multiple devices arranged in a distributed environment that collectively provide the functionality described herein. Additionally, other components not shown may also be included within the network environment.

Example system 100 includes user devices 102 and 104, which may comprise any type of user device capable of receiving input from a user. For example, in one embodiment, user devices 102 and 104 may be the type of computing device described in relation to FIG. 6 herein. By way of example and not limitation, a user device may be embodied as a personal data assistant (PDA), a mobile device, a laptop, a tablet, remote control, entertainment system, vehicle computer system, embedded system controller, appliance, consumer electronic device, or other electronics device capable of receiving input from a user. The input may be received by one of many different modalities, such as by way of example and not limitation, voice or sound, text, touch, click, gestures, the physical surroundings of the user, or other input technologies described in connection to FIG. 6. For instance, a user may utilize a search engine to input a query, intending to receive information highly relevant to the query. Or a user may use voice commands with a gaming system, television, etc. All of these forms of input, as well as others not specifically mentioned herein, are contemplated to be within the scope of the present invention. In some embodiments, user input and user input libraries from user devices 102 and 104 may be stored in storage 106.

Example user devices 102 and 104 are included in system 100 to provide an example environment wherein language models created by embodiments of the invention may be used by one or more user devices 102 and 104. Although, it is contemplated that aspects of the learner algorithm described herein may operate on one or more user devices 102 and 104, it is also contemplated that some embodiments of the invention do not include user devices. For example, aspects of the learner algorithm may be embodied on a server or in the cloud. Further, although FIG. 1 shows two example user devices 102 and 104, a user may be associated with only one user device or more than two devices.

Storage 106 may store training material; entity definitions; information about parsed representations of corpora; statistical information, which may be determined from statistics determining component 126; and LMs, which may be produced by language model generating component 128. In an embodiment, storage 106 comprises a data store (or computer data memory). Further, although depicted as a single data store component, storage 106 may be embodied as one or more data stores or may be in the cloud.

By way of example and not limitation, training material stored on storage 106 may include textual information collected, derived, or mined from one or more sources such as user queries, SMS messages, web documents, electronic libraries, books, user input libraries, or artificially collected or created samples, for example. Training material may be utilized and stored based on characteristics of a language model to be optimized. In one embodiment, training material comprises a collection of in-domain words, sentences or phrases, and may be referred to herein as a corpus.

Storage 106 may also store information about parsed representations of corpora (i.e., parses). In some embodiments, corpora parses are stored as a lattice structure, as described in connection to parsing component 124. Information about the parses may include tokens created from words, entities, or phrases of a corpus; statistics associated with the tokens; and tags, which may identify the token type. In some embodiments, tokens are tagged by parsing component 124 to represent a type of sequences of words, such as an entity-type (also referred to herein as an entity class). Tags facilitate naming and identifying a span or words that likely belong together. Thus, the example provided above, "i'd like to see movie up in the air in amc sixteen and then go home," may be represented as "i'd+like+to see movie <movie>in <theater> and then go+home." The span of words "up-in-the-air" may be tagged and replaced by entity-type <movie>. Similarly, "amc sixteen" may be tagged and replaced by entity-type <theater>. The sequence "i'd+like+to" may be tagged as a carrier phrase.

Entity definitions include information about one or more entities associated with entity-types. As used herein, the term "entity" is broadly defined to include any type of item, including a concept or object that has potential relationships with other items. For example, an entity might be the movie "Life is Beautiful," the director "Roberto Benigni," or the award "Oscar." Collections of entities carrying similar syntactic and/or semantic meaning comprise entity types (e.g. movie titles, songs, time expressions etc.). Furthermore, related entity types can be organized into domains. For instance, within the movie domain, the movie "Life is Beautiful" is directed by "Roberto Benigni," and the movie also won an Oscar.

In one embodiment, entity definitions comprise explicitly enumerated entity instances associated with an entity-type, such as a weighted list of alternatives (e.g., word tries) for a particular entity-type. For example, for the actor entity-type, entity definitions might include a list of actor names. In some embodiments, as described below, each actor name (or each instance of an entity) has a corresponding probability (statistical data), which may correspond to how popular (frequently occurring) the actor is, based on the training material. Thus, a particular instance of an entity for an entity-type may be determined based on the list of entities and probabilities.

Entity definitions may also comprise implicitly defined instances of entity-types. In particular, for certain entity-types, it is not efficient to explicitly enumerate all possible instances of the entity-type. For example, while all (or most) actors could be explicitly included in a definition for the actor entity-type, it is not efficient to enumerate all possible phone numbers, temporal information, such as dates and times, or other combinatorial entity-types. Therefore, in some embodiments, these entities may be implicitly defined by combinatorial models that can provide the entity definition. For example, a finite state machine (FSM) or similar model may be used. As with explicitly enumerated entity definitions, in some embodiments, implicitly enumerated entity instances have a corresponding probability (statistical data), which may correspond to how frequently occurring the entity instance is within the training corpus.

In some embodiments, the entity definitions may be updated through various iterations of the learner, as further described in connection to FIG. 3. For example, initially the list of actors included in the entity definitions for the actor entity-type may have an equal weighting (representing probabilities or statistical data), but it may be determined over several iterations that certain actors (e.g., Brad Pitt) are more common than other actors (e.g., Terry O'Quinn). Thus, statistical data associated with Brad Pitt would be updated to reflect this. Similarly, for the temporal entity-types, initially all instances of an entity-type for times may have an equal probability. But it may be determined that certain times are more popular; for example, in an application domain related to office meetings, a meeting scheduled at 3 pm is probably more popular (frequently occurring) than one scheduled at 11 pm. Accordingly, the corresponding statistical data for the entity definitions may be updated to reflect this.

Language model trainer 120 comprises accessing component 122, parsing component 124, statistics determining component 126, and LM generating component 128. In one embodiment, language model trainer 120 may be implemented on one or more devices, such as user devices 102 and 104, on a server or backend computing system (not shown), or on a distributed platform (not shown) in the cloud. Language model trainer 120 is configured to determine and optimize LMs for in-domain applications. Language model trainer 120 and its components may reference a plurality of text data and/or information stored on storage 106 to implement embodiments of the invention, including the methods described in connection to FIGS. 3-5.

The accessing component 122 is configured to access corpora of textual information, entity definitions, statistics information, and/or language models. Textual information (or text data) may comprise one or more letters, words, or symbols belonging to one or more languages, and may comprise language model training materials such as described in connection to storage component 106. In an embodiment, accessing component 122 accesses one or more entity definitions and an in-domain corpus of words. The one or more words may include stand-alone words, words comprising phrases, words in sentences, or a combination thereof. The accessed information might be stored in storage 106, memory, or other storage. Further, the information may be accessed remotely and/or locally.

Parsing component 124 is configured to generate alternative parsed representations of a corpus of textual information. Each parse includes a series of non-overlapping tokens representing the corpus. Each of the alternative parses represents the corpus using a different formation of tokens. For example, using the corpus "i'd like to see up in the air," one alternative parse would be "i'd+like+to", "see", "up+in+the+air". Another alternative parse would be "i'd+like", "to+see", "up+in", "the", "air". Each parse may have statistical data associated with it, which may be determined by statistics determining component 126 and used to produce a new (or update an existing) LM by LM generating component 128.

Parsing component 124 uses statistical data associated with an LM to determine the alternative parses of the corpus. With each iteration of the learner algorithm, alternative parsed representations of the corpus are determined based on an LM, which may have been generated based on statistics associated with the parses from the previous iteration. In this way, the same sequences of words from the corpus may be modeled differently, such as a part of a carrier phrase in one representation, separate words in another representation, or a named entity in yet another representation. In some embodiments, new parses are determined with each iteration, while in other embodiments all possible parses (or the most probable parses based on the statistical information) are determined initially, and then a subset of these are used in each iteration by the learner algorithm.

In an embodiment, parsing component 124 determines a "lattice" data structure of nonlinear sequences of corpus elements. The lattice data structure is a directed graph providing a compact representation of a number of alternative parses. Each path through the lattice produces a different parse of the corpus, and each path is associated with a probability. One particular path (e.g., "i'd+like+to" "see" "up+in+the+air") may be determined to have a higher probability than another path (e.g., "i'd+like" "to+see" "up+in" "the" "air").

In one embodiment, parsing component 124 may be embodied using trellis, where each position in a sentence corresponds to a trellis slice and states of the slide (contexts) represent: context n-gram history: previous (n−1) tokens in the parse and their word-lengths (e.g., phrase "i+live+in" followed by a 2-word long instance of entity STATE), and/or currently active entity, the state with this entity and its current length (if any; e.g., second word of phrase "i+live+in"). In some embodiments, parsing component 124 stores parse information in storage 106. Additional details regarding parsing are described in connection to FIG. 2.

Statistics determining component 126 is configured to determine statistical data such as the frequency, occurrence, proximity or word distance between words or elements in the corpus or token, and/or other probabilities associated with the tokens making up the parses and elements within the tokens, such as words or entity information. This includes estimating the n-gram level probabilities for tokens used for an LM and determining the maximum likelihood estimates for the n-gram probabilities. In particular, statistics determining component 126 determines statistics used to produce a new or updated LM including (a) probabilities of a specific token, given a token history (i.e., tokens following each other), and (b) probabilities within tokens, such as the probability of a word(s) given a token (such as the probability of a specific instance given an entity-type). Statistical data determined by statistics determining component 126 also includes entity statistical data, or probabilities associated with entity definitions, as described above.

In an embodiment, using a training corpus and entity definitions, statistics determining component 126 may determine a first set of statistical data for an initial (or first) LM. This first set of statistical data may comprise a first set of entity statistics associated with the entity definitions and statistical information determined from the training corpus. From the first set of statistical data, LM generating component 128 may produce a first LM, as described below. In one embodiment, the first LM is a unigram LM (unigram in terms of tokens). Parsing component 124 may use the first LM to determine a first set of alternative parses comprising sequences of tokens representing the training corpus. Statistics determining component 126 is configured to determine a second set of statistical data for a second LM based on the token information from the first set of alternative parses, as described above. For example, statistical data may be collected or obtained by analyzing each of the alternative parses in the first set of alternative parses. In an embodiment, statistics determining component 126 is also configured to determine a second set of entity statistics from the first set of alternative parses. The second set of statistical data and/or the second set of entity statistical data may be used by LM generating component 128 to produce a second LM. In one aspect, the second LM may be considered an updated, optimized version of the first LM.

In further embodiments, the second LM may be used by parsing component 124 to determine a second set of alternative parses, from which statistical data determined by statistics determining component 126 may be used by LM generating component 128 to produce a third LM. This description illustrates the iterative nature of embodiments described herein; where a plurality of sets of language model statistical data, sets of entity statistical data, language models, and sets of alternative parses may be generated to continually improve the current iteration of the language model by optimizing it for the corpus domain.

In one embodiment, entity definitions might be similarly improved through iteration, whereby statistics determining component 126 determines a set of entity statistical data from the set of alternative parses, such as based on frequency (popularity) of entities, as described above, or proximity to other entities or tokens.

LM generating component 128 is configured to take the statistical data determined by statistics determining component 126 and produce a new (updated) LM. In particular, estimating and using n-gram probabilities of tokens (parses) is equivalent to training and using an n-gram language model, thus LM generating component 128 applies the statistical data corresponding to the tokens of the alternative parses as a new LM, in an embodiment.

The LM produced by LM generating component 128 from statistical data includes two parts: (a) a probability of a specific token, given sequences of prior tokens, and (b) a probability of a word or specific entity instance, given the token or entity-type (i.e., what is happening within the tokens). For example, the first part might include the probability of "actor" token given the sequence of tokens "I'd+like+to" and "follow" (word token), as in "I'd like to follow Brad Pitt." The second part, which relates to the entity definitions, might include the probability of "Brad Pitt" (specific instance) given "actors" (entity-type). Thus, from the example above, we might expect a trained LM to have a higher probability of Brad Pitt than Terry O'Quinn.

In embodiments, the LM produced by LM generating component 128 is a joint model because it may be considered to comprise aspects of three models: (1) Entity models (i.e., entity definitions), which may be initialized as predefined weighted lists or grammars, but can also be tuned to the learner algorithm, as described above; (2) carrier phrase models, which may be estimated from the corpus based on word n-gram occurrence statistics (for example, the more often a particular n-gram occurs relative to occurrences of its ingredient elements (words), the better chance of it becoming a carrier phrase. Similarly, co-occurrence statistics of the n-grams left and right context also contribute to this determination.); and (3) word level language models. For example, by training an LM on top of the training corpus (either based on an original word-level representation or alternative parses determined at intermediate stages), the probability of one token given a number of other tokens may be estimated. Combined into a single generative probabilistic model, the three component models can effectively tag the corpus in terms of higher-level tokens.

In an embodiment, during the first iteration, LM generating component 128 may generate an initial LM based on statistical data determined from the training corpus and a set of entity definitions, as described herein. From this LM, a first set of parsed representations of the corpus may be determined, as described above, from which statistical data is determined and used to produce an updated LM. With each iteration of the learner algorithm, LM generating component 128 produces an updated LM that is further optimized for the domain of the training corpus. In some embodiments, the updated LM updates or replaces the LM from a previous generation. This updating or replacement of a previous language model with an updated language model may continue for multiple iterations of the learner algorithm, for example, until convergence or a set of statistical data associated with the model reaches an optimization threshold, and/or for a predetermined number of iterations.

In some embodiments, only the most recently updated or optimized language model and/or entity definitions are retained and applied by the learner algorithm for the next iteration. In alternative embodiments, more than one updated language model and/or entity definitions might be retained and/or applied by the learner. Further, models and/or definitions might be retained to evaluate the collected statistics and/or diagnostically analyze the learner as implemented by some embodiments of the invention.

Accordingly, language model trainer 120 and its components determine and optimize language models for in-domain applications. The following illustrates one embodiment in regards to FIG. 1. By way of example only, in an embodiment, we start off accessing a corpus from storage 106 that comprises a certain number of sentences. During each iteration of the learner algorithm, each of the sentences is represented by many different alternative parses, as determined by parsing component 124 using a language model. Each parse has a probability, determined by statistics determining component 126, which is reflected in the language model used to generate the parse.

In particular, each sentence may be turned into a number of different parses (different representations); with each one assigned a probability. For example, suppose the corpus is "I'd like to follow Angelina Jolie on Twitter." Then using the same LM, parsing component 124 may determine the alternative parses such as the following: a first alternative parse comprising separate words (i.e., each token in the parse is a single word from the corpus); a second alternative comprising: "I'd+like+to" (as a phrase token), "follow" (as a word token), "Angelina Jolie" (as an entity token), "and" (as a word), "on" (as a word), "Twitter" (as a word); and a third alternative comprising: "I'd+like+to" (as a phrase), "follow+Angelina+Jolie" (as a phrase), "on" (as a word), "Twitter" (as a word). (For the sake of clarity, only three example parses are provided in this example, but embodiments may include many additional parses.)

Thus, the same language model is used by parsing component 124 to produce several alternative parses. As described above, each parse has a probability, which may be determined by statistics determining component 126. More specifically, each parse has a posterior probability, and so do tokens within a parse; for instance, probability of "Angelina Jolie" as an instance of an actor entity token, or as a phrase; or individual probabilities of words "Angelina" and "Jolie".

The alternative parses and their associated probabilities (as weights) are used by LM generating component 128 to produce a new LM, which may be considered an update to the previous LM. As might be expected, for earlier iterations, the probabilities associated with the parses may appear unreasonable. (For example, during early iterations, the token "Jolie+on" might have the same probability as "Angelina+Jolie".) But as the iterations continue, the parses become as might be expected. For example, if "I'd+like+to+follow" appears often in the context of an actor/actress, then the iterative training process discovers this.

In some embodiments, only a limited number of parses are produced with each iteration, after the first iteration, based on the probabilities associated with the parses. For example, in one embodiment, all possible parses of a sentence may be implicitly ranked at each iteration by probability so that the more probable parses come to the top and can be explicitly enumerated (n-best). Moreover, in practice, parses in the later iterations may not be present in the alternative parses determined in earlier iterations.

Because the learner is unsupervised, the most probable parses may be determined automatically, in some embodiments. Based on the associated probabilities, the learner may also determine whether a sequence of words is a phrase token or entity token, and if it is an entity, then what is the likely entity-type (or entity class). For example, using the corpus "I'd like to follow Angelina Jolie on Twitter", the learner may determine a representation "I'd+like+to follow <actor>". Using statistics determining component 126, the learner may compare the probabilities of "Angelina" as a word, "Angelina Jolie" as a phrase, or "Angelina Jolie" as an instance of an entity in the actor entity class.

The following illustrates another example of generating alternative parses in regards to FIG. 1. By way of example only, in an embodiment, a training corpus of textual information is accessed by accessing component 122. The corpus includes the words: "I'd like to see up in the air at amc sixteen and then go home." Using an initial language model, parsing component 124 determines a set of alternative parses. For each alternative parse, statistics determining component 126 determines probabilities associated with each parse, which may be used as weights by LM generating component 128 to produce a new LM. In the next iteration, the new LM may be used by parsing component 124 to determine another set of alternative parses.

After a number of iterations, from statistical data associated with the LM for a current iteration, parsing component 124 may determine a parse that includes the tokens "I'd+like+to" and "go+home" with associated probabilities indicating that these tokens are likely common phrases. Similarly, from the statistical data associated with entity definitions of the LM, parsing component 124 may recognize and parse tokens "up+in+the+air" and "amc sixteen" as entity tokens. As described above, in an embodiment, the entity tokens may be tagged and replaced by an entity class. For example, "up+in+the+air" may be tagged and replaced by entity-type <movie>, and "amc sixteen" tagged and replaced with the entity-type <theatre>.

As described above, once a set of alternative parses has been determined by parsing component 124, statistics determining component 126 determines probabilities associated with the parses, including probabilities associated with the tokens in the parses. Over multiple iterations, the statistical data associated with alternative parses and tokens reveals most probable tokens for the corpus domain. (For example, "Angelina+Jolie on Twitter" will likely be determined as more probable than "Angelina Jolie+on Twitter.") Further, the statistical data may determine additional information, such as the probability that the movie entity-type will occur within n words of the theater entity-type or that the entity "up in the air" is likely to occur within m words of the phrase "I'd+like+to+see."

The following illustrates another example of determining and optimizing a language model for an application domain, in regards to FIG. 1. This example may apply to the first time that a particular training corpus is analyzed, such that a previous iteration of a language model for that particular corpus is not available. By way of example only, in an embodiment, a training corpus of textual information and a set of entity definitions is accessed by accessing component 122. From this, an initial LM may be determined on top of the corpus. In one embodiment, the initial LM comprises a unigram LM.

In particular, parsing component 124 may parse the corpus as sequences of words up to n words in length (i.e., tokens of n words). These tokens may be evaluated as candidates for phrases and entities. For example, by checking a token against the entity definitions by counting the occurrences of a candidate entity or phrase in the corpus. The occurrence counts may be compiled to form an initial set of statistical data, which may be used as weights for an LM. In this aspect, the initial set of statistical data is not collected from a previous set of alternative parses. For example, statistics determining component 126 may determine that a particular phrase, such as "I'd+like+to," occurred as a phrase in the corpus n many times, or that "Angelina+Jolie" occurred as an actor m many times and as a director k many times. In an embodiment, the number of all other actors and directors in the corpus may be determined. The ratio of the counts for "Angelina+Jolie" as actor and as director versus the total numbers may be used as an initial probability or weight. In this way, an initial LM may be determined.

Figure 2:
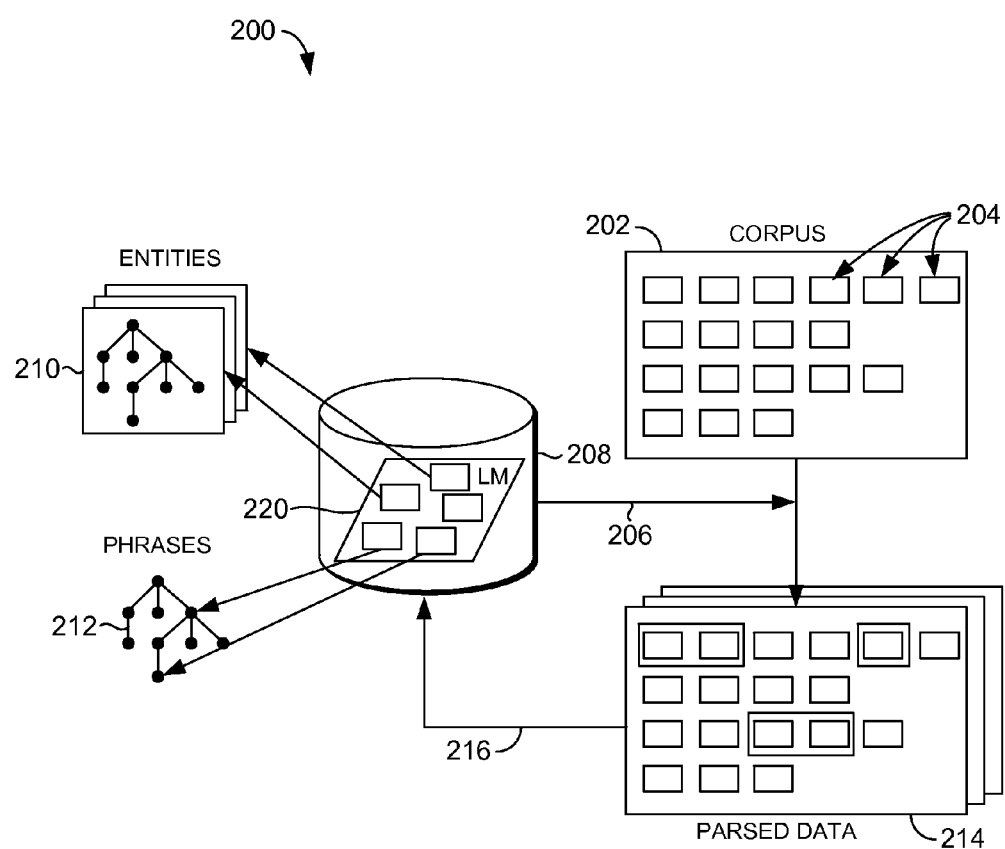
FIG. 2 depicts aspects of the iterative approach to parsing a training corpus in accordance with an embodiment of the invention.

Turning now to FIG. 2, a perspective 200 is illustratively provided that depicts aspects of the iterative approach of one embodiment of the learner algorithm for parsing a training corpus. Perspective 200 shows a corpus 202 of textual information comprising sequences of words 204, and a set of entity definitions 210 and phrase definitions 212. Entity definitions 210 and phrase definitions 212 may include explicitly and/or implicitly defined entities and phrases. For example, a movie entity-type might explicitly enumerate every movie title with a corresponding probability (or weight) associated with each title; while a date, phone number, or other temporal expression may be defined by a combinatorial model, such as an FSM. The trie structure is shown in items 210 and 212 to indicate definitions of an entity-type or words or phrases that are generated out of component words.

From the corpus 202 and the entity and phrase definitions (items 210 and 212), each iteration of the learner algorithm applies a language model 220 at 206 to generate parsed representations of the corpus (shown as parsed data 214). Statistical data determined in part from the parsed data 214 may be applied at 216 to update the LM 220 (which may be stored in storage 208) and in some embodiments also update the entity definitions 210 and phrase definitions 212. For the first iteration, an LM may be trained on top of the entity and phrase definitions, such as described in connection to FIG. 1. Thereafter, the LM is updated with each iteration, based on statistical data associated with the parsed representations. Iterations may continue until convergence or until the model is deemed satisfactory, at which point the final corpus representation may be used to train an entity-class-based language model (a production language model), with common carrier phrases encoded as new pseudo-words.

Figure 3:
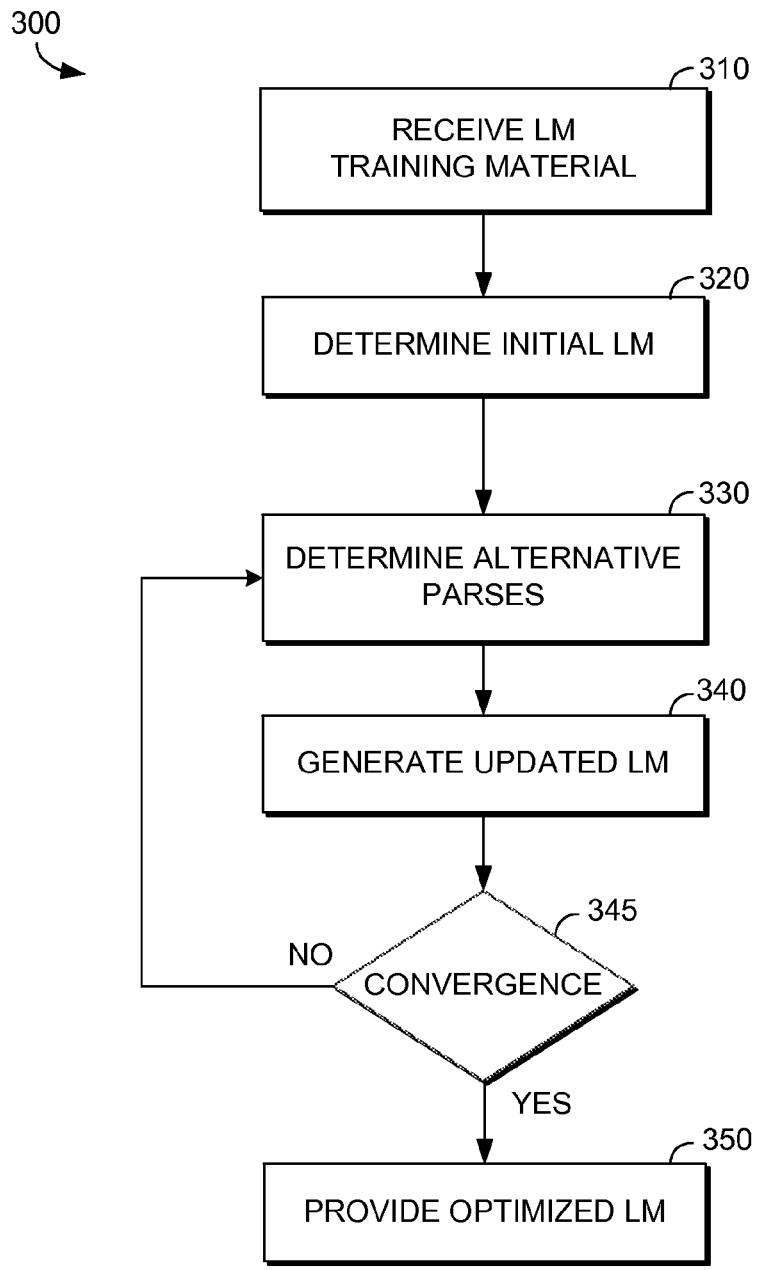
FIG. 3 depicts a flow diagram of a method for optimizing a language model for a domain by iterative parsing of a training corpus, in accordance with an embodiment of the present invention.

Turning to FIG. 3, a flow diagram is provided illustrating one exemplary method 300 for determining and optimizing a language model. The language model produced according to method 300 is suitable for use in an application domain represented by a training corpus that is used to optimize the model.

At a high level, in one embodiment, once an initial LM is determined, such as described below, each iteration of method 300 starts with an LM that it produced in a previous iteration. The LM reflects statistical data about a training corpus, which may be expressed as weights, including (a) a probability of a specific token, given sequences of prior tokens, and (b) a probability of a word or specific entity instance, given the token or entity-type (i.e., what is happening within the tokens). Given the LM, the training corpus may be parsed into alternative representations of tokens according to the statistical data reflected in the LM. From these different representations or parses, other statistical data may be determined and used to produce a new LM, which may be considered an updated LM. Thus, for this embodiment, each iteration of method 300 includes two steps: a parsing step, wherein the corpus is represented in terms of sequences of tokens, and a step for determining a new LM from probabilities associated with the parses.

For example, consider a training corpus already represented as a collection of weighted token-level sentences, which may have been determined from an initial LM; for example, the sentence: "i+would+like+to travel from CITY to CITY" with a weight of 10. It is straight forward to estimate an n-gram language model based on this training corpus by incrementing the count for each n-gram in the corpus by the weight of the sentence it occurred in. But consider further that each sentence has its probability mass split among several alternative parses. In the above case, the alternatives might include "i+would like+to travel from CITY to san+francisco" with weight 3; or "i would like to travel+from+boston to CITY" with weight 2. Thus, to determine an LM from these alternative parses, again the token n-grams from all alternatives are counted. However, now the counters are incremented only by a fraction of the original weight, which is equal to the cumulative posterior probability of the parses containing these n-grams. Using this new LM, the original word-level representation of the training corpus may be parsed to produce another collection of alternative parses for each of its sentences; and thus the next iteration begins. Each iteration produces an LM that is further optimized to the domain of the corpus. In this sense, the learner performs as an Expectations Maximization algorithm, wherein determining a parse corresponds to the expectation step and generating the updated LM, by estimating probabilities associated with the tokens of the parse, corresponds to the maximization step.

Accordingly, method 300 begins step 310, wherein LM training material is received. In one embodiment, training material comprises a training corpus of textual information and a set of entity definitions. The textual information may comprise one or more alphanumeric characters, or words, which may be in sentences, or other sequences of alphanumeric character strings. In one embodiment, the training material may be received from one or more sources including user queries, SMS messages, web documents, electronic libraries, books, user input libraries, or artificially collected or created samples, for example. In one embodiment, the training material defines a domain and in one embodiment is related to a structured application domain; for example, a home entertainment system, personal device, or vehicle.

At step 320, an initial LM is determined. In one embodiment, an initial LM may be created from statistical data determined from the training corpus, at a word-level, and entity definitions, as described herein. The statistical data underlying the language model creation for the first iteration can be initialized from word-n-gram powersets in all phrases of the word-level training corpus. In one embodiment, entity definitions may be seeded with weighted lists or grammars, which may be uniformly distributed, and phrases may be automatically identified in the corpus based on their occurrence statistics, as described above.

In one embodiment of step 320, all n-grams of a certain length are extracted from the corpus. Each n-gram that constitutes a name from some entity is also counted as an observation of this entity (weighted by the prior probability of this name in this particular entity). In one embodiment, the set of these n-grams may be then filtered with respect to a minimum observation frequency. From these accumulated counts, a unigram LM may be trained that is used to parse the data in the first iteration.

In particular, all word sub-sequences $\pi$ of length up to L are extracted from the training corpus. For each $\pi$, all entities c are queried for prior probability $P^{prior}(\pi|c)$ and, where it is positive, the count of c is incremented by $\#w*P^{prior}(\pi|c)$, where w represents a sentence of N words, $w=w^1 \ldots w^N$. Corpus-wide counts of $\pi$ are accumulated as well. In one embodiment, where the count exceeds a minimum threshold, $\pi$ is designated a phrase token. Additionally, all regular words and classes, regardless of their occurrence count, become tokens as well. Thereafter, a unigram LM may be trained from this statistical data as the initial token-level LM.

In some situations, certain entity surface forms may also be common words or expressions; for example, the movie titles "It," "Her," or "Up." To avoid having entities with these surface forms being instantiated in every sentence with these words, in some embodiments, these terms may be first identified, such as by using an off-the-shelf language model, and then banned from participating in parsing for the first few iterations.

At step 330, alternative parses are determined from the corpus using an LM, which for the first iteration may be the initial LM determined from step 320, or for subsequent iterations, the LM determined in step 340. In an embodiment, alternative parsed representations of the corpus are determined using the statistical data reflected in the LM, as described herein, wherein each parse comprises a sequence of one or more tokens that together represent the corpus.

In an embodiment, each sentence of the corpus may be turned into n different parses (n different representations); with each one assigned a probability (n-best). For example, consider a sentence of N words, $w=w^1 \ldots w^N$ and real-valued weight L (that initially may reflect observational counts: $L(w):=\#w$). This sentence may be segmented in many different ways according to the statistical data associated with the LM, with single- and multi-word tokens competing against each other for words. Thus, a particular parse $c^k = (c_1^k \ldots c_{|c^k|}^k)$ may induce segmentation $\pi^k = (\pi_1^k \ldots \pi_{|c^k|}^k)$ that partitions the sentence into a number of word sub-sequences $\pi_i^k$, with each sub-sequence being a token instance $c_i^k$. A joint likelihood of the sentence and the parse may be obtained via the chain rule:

$$P(w, c^k) = \prod_{c_i^k \in c^k} P(c_i^k | h_i^k) P(\pi_i^k | c_i^k) \quad (1)$$

The first term is an n-gram probability of token $c_i^k$ in token n-gram history $h_i^k = c_{i-n+1}^k \ldots c_{i-1}^k$. The second term is determined by the nature of the token. For words and phrases, this probability is 1.0; for an entity class, this is the prior probability of a particular surface form of the class. Depending on the entity nature, it may be represented by one of the following two formalisms, as described in connection to FIG. 2. Specifically, for (weighted) lists such as personal names or movie titles, word tries may be used. (In one embodiment, word tries are also used to represent the plurality of phrases.) For combinatorial entities, such as dates and times, combinatorial models, such as FSMs, may be used.

In some embodiments, only a limited number of parses are produced with each iteration, after the first iteration, based on the probabilities associated with the parses. For example, in one embodiment, all possible parses of a sentence may be ranked at each iteration by probability so that the more probable parses come to the top (n-best).

At step 340, an updated LM is generated. In an embodiment, the updated LM is produced based on statistical data associated with the alternative parsed representations determined in step 330. In particular, an n-gram language model may be produced (or updated) by determining the n-gram probabilities of tokens, such as occurrence statistics for token n-grams, information-theoretical criteria for carrier phrases, and/or instance probabilities within entity-types, which may be estimated from the n-best parses determined in the previous step.

In one embodiment, continuing with the example introduced in step 330, maximum-likelihood (ML) estimates for the n-gram probabilities P(c|h) for token c and its token-level history h from a single sentence w, may be determined by accumulating parse-specific observation counts:

$$P^{ML}(c \mid h, w) = \sum_k \frac{\#ch}{\#h}\bigg|_{c^k} P(c^k \mid w) \qquad (2)$$

$$= \sum_k \frac{\#ch}{\#h}\bigg|_{c^k} \frac{P(w \mid c^k)}{\sum_c P(w, c)}$$

Taking the average over an entire corpus $\{w_j\}$ closes the expectation maximization loop:

$$P^{ML}(c \mid h) = \sum_j P(w_j) P^{ML}(c \mid h, w_j) \qquad (3)$$

$$= \sum_w \frac{L(w)}{\sum_{\bar{w}} L(\bar{w})} P^{ML}(c \mid h, w)$$

$$= \sum_w \sum_k L'(w, k) \frac{\#ch}{\#h}\bigg|_{c^k},$$

where the weights of each parse may be set to:

$$L'(w, k) := \frac{L(w)}{\sum_{\bar{w}} L(\bar{w})} * \frac{P(w \mid c^k)}{\sum_c P(w, c)} \qquad (4)$$

In an embodiment, the maximization of equation (3) may be naturally extended to incorporate smoothing techniques, such as back-offs. Accordingly, this process is equivalent to producing an n-gram LM from a new representation of the training corpus that now comprises a weighted collection of token-level parses of the original sentences.

At step 345, it is determined whether to continue iterating method 300. In an embodiment, the LM produced in step 340 is evaluated in order to determine whether convergence has been reached, whether a set of statistical data associated with the model reaches an optimization threshold, or whether the model is otherwise determined satisfactory based on the evaluation. In one embodiment, an iteration count may be employed such that the determination as to whether to continue iterating is based at least in part on the iteration count. If it is determined that another iteration is to be performed, then method 300 goes to step 330, wherein the LM generated in step 340 is used to determine alternative parses of the training corpus. On the other hand, if the model is determined to be satisfactory (e.g., if convergence is determined), then method 300 proceeds to step 350.

At step 350, the optimized LM is provided. In an embodiment, the LM provided in step 350 is optimized for the domain defined or represented by the training corpus. In an embodiment, the final corpus representation may be used to train an entity-class-based language model for the application domain, with common carrier phrases encoded as new pseudo-words.

Some embodiments of method 300 further comprise retraining the definitions of entities and phrases, with each iteration. In particular, in some embodiments, a second goal of the learner algorithm includes optimizing the definitions of entities, which may be represented in the LM determined during the iteration. For example, continuing with the example introduced in step 330, entity definitions may be updated in a similar maximum-likelihood fashion. For entities modeled as word tries, counting is simple. If π is a particular surface form of entity token c, then its probability may be determined as:

$$P^{ML}(\pi \mid c) = \sum_j P(w_j) P^{ML}(\pi \mid c, w_j) \qquad (5)$$

$$= \sum_w \sum_k L'(w, k) \frac{\#(c, \pi)}{\#c}\bigg|_{c^k}$$

For combinatorial entities such as times and dates, the re-estimation is similar, except that it may be carried out for each emanating arc (and final cost) of each state, in a normalized deterministic FSM. Moreover, because training corpora may be limited in size, the ML estimator from equation (5) may suffer from over-training, in some scenarios. On the other hand, the generic entity definitions might be robust but may lack domain specificity, in some scenarios. Therefore, in some embodiments, a trade-off may be established between the two. For example, on each iteration t we can linearly interpolate between the posterior probability $P_{(t)}^{ML}$ and prior probability $P_{(t)}^{prior}$ such that:

$$P_{(t)}(\pi \mid c) := (1 - \lambda_{(t)}) P_{(t)}^{ML}(\pi \mid c) + \lambda_{(t)} P_{(t)}^{prior}(\pi \mid c) \qquad (6)$$

with iteration-specific inertia $\lambda_{(t)}$ defined as:

$$\lambda_{(t)} := \begin{cases} 1.0, & \text{if } t < \kappa \text{ or } Z_{(t)}(c) < \theta \\ \lambda^{0.5(t-\kappa)}, & \text{otherwise.} \end{cases} \qquad (7)$$

For the first κ iterations, the prior probability may be determined by the initial LM definition; after that: $P_{(t)}^{prior}(\pi \mid c) := P_{(t-1)}(\pi \mid c)$. Parameters θ, κ, and λ may be set empirically, and $Z_{(t)}(c)$ is the normalization factor:

$$Z(c) = \sum_w \sum_k L'(w, k) \#c \Big|_{c,k} \quad (8)$$

computed at iteration t.

In some embodiments of method 300, one or more thresholds may be applied to control the size of the model. For example, thresholds may be employed to make it harder for new items to be accepted into the model. In some embodiments, thresholds may be determined empirically or may be determined based in part on a particular corpus or structured domain. Three examples of such thresholds include thresholds for phrases (non-trivial sequences of words that we accept as new tokens), (n>1)-grams of tokens that include phrases, and named entity definitions.

In situations where a high number of long phrases exist, the model may become over-trained. Thus, in some embodiments, thresholds may be imposed on how many times a phrase needs to occur in the corpus in order to be preserved for a future iteration. Because some embodiments of the learner algorithm apply alternative weighted parses and rely on fractional observation counts, such thresholds acquire a different meaning. For instance, a phrase might occur in parses of 100 different sentences but only in n-best alternatives of very low probabilities. As a result, this phrase might not even survive occurrence threshold of 1.0.

Similarly, a high number of n-grams may cause the model to become over-trained. Thus, in some embodiments, cut-offs may be imposed regarding how many times an n-gram of particular length needs to occur in order to be accepted into a language model. In an embodiment, higher cut-offs may be imposed for n-grams with one token being a phrase.

In some embodiments, thresholds may be imposed based on named entity definitions, such as to purge entities whose corresponding probability drops below a certain threshold. For example, as an LM becomes updated with each iteration of method 300, the occurrence of individual names/transitions may be counted in the parses created by the LM and used to update the probabilities in the entity definitions. In one embodiment, measured frequencies may be interpolated with the prior probabilities in the spirit of Dirichlet prior distributions, where prior probabilities have been estimated on the basis of some other corpus of a certain size.

Figure 4:
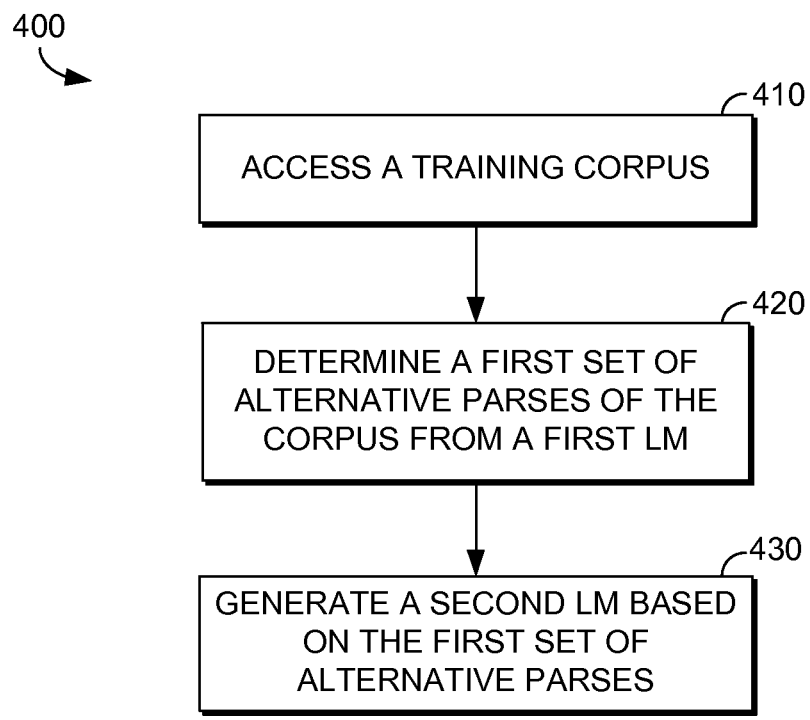
FIG. 4 depicts a flow diagram of a method for optimizing a language model for a domain, in accordance with an embodiment of the present invention.

Turning now to FIG. 4, a flow diagram is provided illustrating one exemplary method 400 for creating a language model optimized for a domain defined by a corpus. At step 410, a training corpus is accessed. In an embodiment, the training corpus comprises text data, for example one or more alphanumeric characters or words, which may be in sentences, or other sequences of alphanumeric character strings. The training corpus may be accessed from a data store or may be created, mined, or derived from one or more sources such as user queries, SMS messages, web documents, electronic libraries, books, user input libraries, or artificially collected or created samples, for example.

At step 420, a first set of alternative parses are determined from the training corpus using a first LM. In an embodiment, step 420 expresses the training corpus in terms of "tokens" (or unit n-grams) representing words, entities, or phrases. The first LM is used to parse the training corpus into one or more parses of sequences of these tokens, each parse representing the corpus. The one or more alternative parsed representations of the corpus are determined using a first set of statistical data associated with the first LM. In an embodiment, the first LM is preexisting and may be provided, initially determined from the training corpus, such as described in step 320 of method 300, or may be determined during a previous iteration of an embodiment of the iterative learner algorithm described herein. In an embodiment, the statistical data associated with the first LM includes probabilities, which may be expressed as weights or counts, associated with tokens or each parse. In an embodiment, the statistical data associated with the first LM further comprises entity statistical data.

At step 430, a second LM is determined based on the first set of alternative parses. The second LM may comprise a new LM or update of the first LM that is applied in step 420. In an embodiment, the second LM is determined from a second set of statistical data determined from the first set of alternative parses. For example, from the parsed representation of the training corpus determined in step 420, token n-gram probabilities may be determined, thereby producing a new (second) LM. In an embodiment, the second set of statistical data comprises probabilities of a specific token, given a token history (i.e., tokens following each other), and probabilities within tokens, such as the probability of a word(s) given a token (such as the probability of a specific instance given an entity-type).

In an embodiment, the second LM may be used to determine a second set of alternative parses of the corpus for a next iteration, and the probabilities determined from this second alternative parsed representation are used to produce a third LM, which is even further optimized for the domain represented by the training corpus. Some embodiments of method 400 further comprise updating statistical information associated with entities (entity definitions) and phrases (phrase definitions) based on the first set of alternative parses determined in step 420, such as described in method 300.

It should be noted that while FIG. 4 refers to language models, sets of alternative parses, and sets of statistical data numerically, such as a first set, a second set, a first language model, a second language model, etc., these terms should not be interpreted as being sequential in nature. For instance, a first language model may not, in fact, be the first iterative version of the language model but instead a previous version of the language model when compared to a next iteration of the language model.

Figure 5:
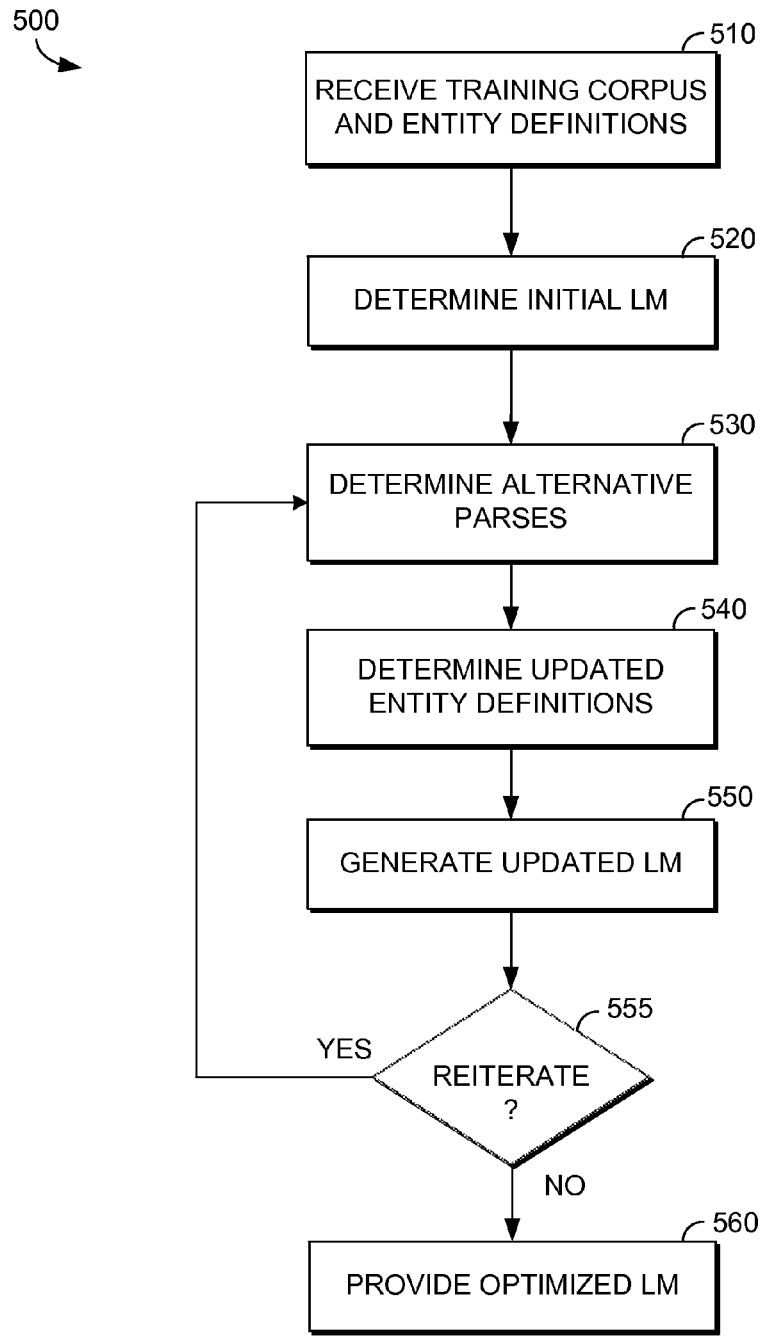
FIG. 5 depicts a flow diagram of a method for optimizing a language model for a domain by iterative parsing of a training corpus, in accordance with an embodiment of the present invention.

Turning to FIG. 5, a flow diagram is provided illustrating one exemplary method 500 for determining and optimizing a language model. The language model produced according to method 500 is suitable for use in an application domain represented by a training corpus that is used to optimize the model.

At step 510, a training corpus and a set of entity definitions are received. The training corpus comprises textual information; for example, one or more alphanumeric characters or words, which may be in sentences, or other sequences of alphanumeric character strings. In one embodiment, the training corpus may be received from training materials that are derived, mined, or collected from one or more sources such as, by way of example and not limitation: user queries, SMS messages, web documents, electronic libraries, books, user input libraries, or artificially collected or created samples. Entity definitions received at step 510 include information about one or more entities associated with entity-types, which may be explicitly or implicitly defined, and corresponding statistical information. For example, in an embodiment, each defined entity has a corresponding probability, which may be predefined or based on the frequency of occurrence in the training corpus (or another corpus). In an embodiment, the probabilities are initially equal for entities defined in the set of entity definitions.

At step 520, an initial language model is determined. In an embodiment, an initial LM may be produced from statistical data determined from the training corpus and statistical data of the entity definitions, as described herein. For example, in one embodiment of step 520, n-grams of a certain length may be extracted from the training corpus. Each n-gram that constitutes an instance of an entity-type is also counted as an observation of this entity (weighted by the prior probability of this instance in this particular entity-type). In one embodiment, the set of these n-grams may be then filtered with respect to a minimum observation frequency. From these accumulated counts, a unigram LM may be trained that is used to parse the data in the first iteration. In one embodiment, the initial LM may be determined as described at step 320 of method 300 (FIG. 3).

At step 530, alternative parses are determined from the corpus using a language model, which for the first iteration may be the initial LM determined from step 520, or for subsequent iterations, the LM generated at step 550. In an embodiment, alternative parsed representations of the corpus are determined using the statistical data reflected in the LM, as described herein, wherein each parse comprises a sequence of one or more tokens that together represent the corpus. In some embodiments, the parsing operation performed in step 530 is similar to embodiments described in connection to step 330 of method 300 (FIG. 3).

At step 540, updated entity definitions are determined. Step 540 comprises updating (or retraining) the statistical data in the set of entity definitions, and in some embodiments, step 540 also comprises pruning the entities included in the set of entity definitions. For example, as described herein, entity definitions maximum-likelihood fashion, such as described in method 300. In an embodiment, the statistical data in the set of entity definitions is updated based on the occurrences of entities or proximity of entities to various tokens in the parses determined in step 530.

At step 550, an updated LM is generated. In an embodiment, the updated LM is produced based on statistical data associated with the alternative parsed representations determined in step 530 and updated entity definitions determined at step 540. In particular, in an embodiment, an n-gram language model may be produced (or updated) by determining the n-gram probabilities of tokens, such as occurrence statistics for token n-grams, information-theoretical criteria for carrier phrases, and/or instance probabilities within entity-types, which may be estimated from the n-best parses determined in step 530. In some embodiments, the LM generating operation performed in step 550 is similar to the embodiments described in connection to step 340 of method 300 (FIG. 3).

At step 555, it is determined whether to continue iterating method 500. In an embodiment, the LM produced in step 550 is evaluated in order to determine whether convergence has been reached, whether a set of statistical data associated with the model reaches an optimization threshold, or whether the model is otherwise determined satisfactory based on the evaluation. In one embodiment, an iteration count may be employed such that the determination as to whether to continue iterating is based at least in part on the iteration count. If it is determined that another iteration is to be performed, then method 500 proceeds to step 530, wherein the LM generated in step 550 is used to determine alternative parses of the training corpus. On the other hand, if the model is determined to be satisfactory (such as if convergence is determined), then method 500 proceeds to step 560.

At step 560, the optimized LM is provided. In an embodiment, the LM provided in step 560 is optimized for a domain defined or represented by the training corpus. In an embodiment, the final corpus representation may be used to train an entity-class-based language model for the application domain, with common carrier phrases encoded as new pseudo-words.

Accordingly, we have described various aspects of technology directed to systems and methods for improving language models for determining and optimizing language models for a domain. In particular, through embodiments of an iterative joint-modeling learner algorithm, a set of alternative parses of a corpus are determined and used to produce (or update) an LM, which may be used to parse the corpus into another set of alternative parses, which may be used to produce a new (or updated) LM. Thus, with each iteration an LM is determined that is further optimized for the corpus domain.

It is understood that various features, sub-combinations, and modifications of the embodiments described herein are of utility and may be employed in other embodiments without reference to other features or sub-combinations. Moreover, the order and sequences of steps shown in the example methods 300, 400, and 500 are not meant to limit the scope of the present invention in any way and, in fact, the steps may occur in a variety of different sequences within embodiments hereof. Such variations and combinations thereof are also contemplated to be within the scope of embodiments of the invention.

Figure 6:
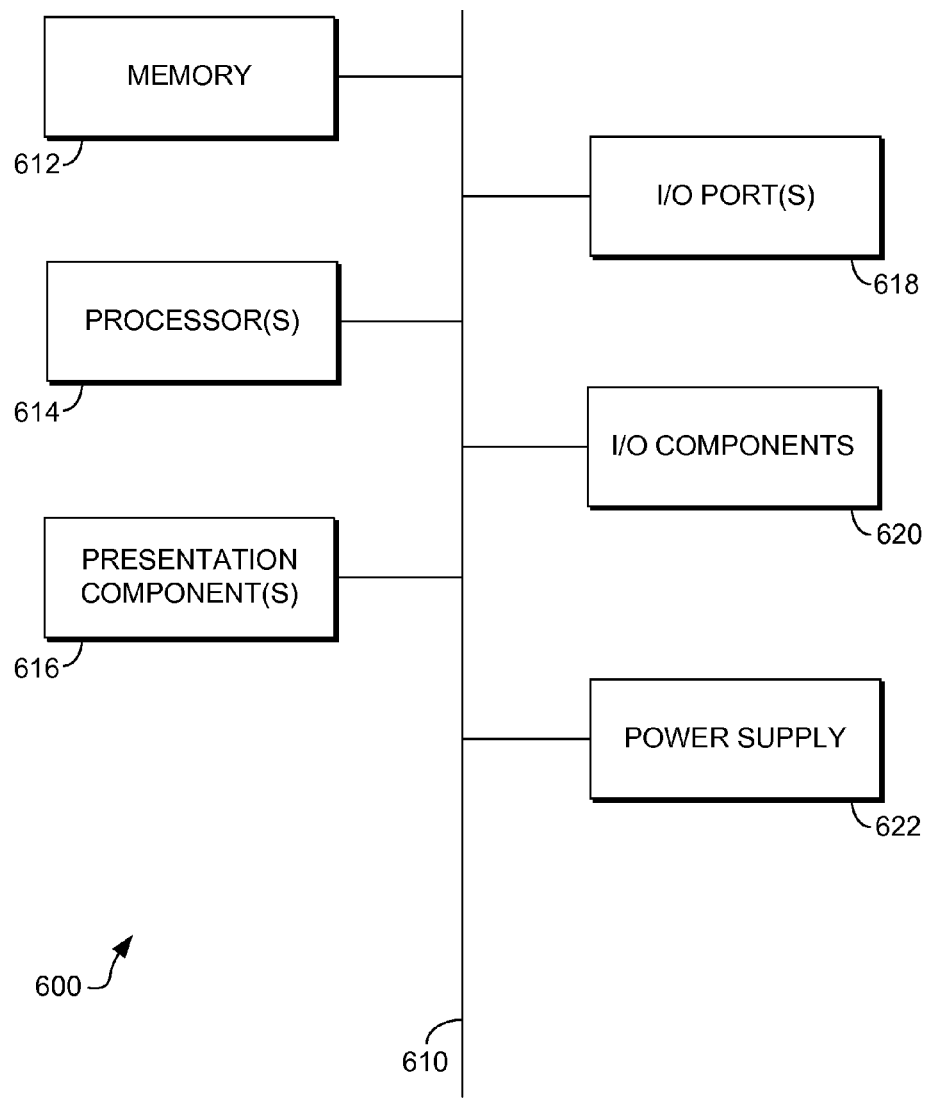
FIG. 6 is a block diagram of an exemplary computing environment suitable for use in implementing an embodiment of the present invention.

Having described various embodiments of the invention, an exemplary computing environment suitable for implementing embodiments of the invention is now described. With reference to FIG. 6, an exemplary computing device is provided and referred to generally as computing device 600. The computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/ output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

Accordingly, in one aspect, an embodiment of the invention is directed to one or more computer-readable media having computer-executable instructions embodied thereon that, when executed by a computing system having a processor and memory, cause the computing system to perform a method for optimizing a language model for a domain. The method includes (a) receiving training material for training a language model, the training material including a corpus of one or more words and (b) determining a language model based on the training material. The method also includes (c) utilizing the language model to determine a set of alternative parses of the corpus, (d) determining statistical data based on the set of alternative parses determined in step (c), and (e) based on the statistical data determined in step (d), updating the language model. The method further includes (f) determining whether the language model is satisfactory, and (g) based on the determination of whether the language model is satisfactory: if the language model is determined to be satisfactory, then providing the language model, and if the language model is determined not to be satisfactory, then repeating steps (c) through (g).

In another aspect, one or more computer-readable media having computer-executable instructions embodied thereon are provided that, when executed by a computing system having a processor and memory, cause the computing system to perform a method for optimizing a language model for a domain performed by a computing device having a processor and a memory. The method includes accessing a training corpus, the training corpus comprising one or more words, and applying a first language model to determine a first set of alternative parses of the training corpus, each parse including one or more tokens. The method also includes determining a first set of statistical data associated with the first set of alternative parses, and generating a second language model based on the first set of statistical data. In some embodiments, the method further includes applying the second language model to determine a second set of alternative parses of the training corpus, determining a second set of statistical data associated with the second set of alternative statistical parses, and generating a third language model based on the second set of statistical data.

In yet another aspect, an embodiment of the invention is directed to a method for optimizing a language model for a domain performed by a computing device having a processor and a memory. The method includes receiving a training corpus comprising one or more words, receiving a set of entity definitions comprising a weighted list of one or more entities, and determining a first language model based on the training corpus and the set of entity definitions. The method also includes, for a number of iterations, each iteration using an iteration language model: (a) utilizing the iteration language model to determine a set of alternative parses of the corpus, (b) determining updated weights for the set of entity definitions, (c) generating an updated language model from the set of alternative parses determined in step (a) and from the set of updated weights determined in step (b), and (d) determining a language model evaluation, wherein the iteration language model is the first language model for the first iteration, and wherein the iteration language model is the updated language model determined in step (c) for each subsequent iteration; and wherein the number of iterations is determined based on the language model evaluation.

What is claimed is:

1. One or more computer storage media having computer-executable instructions embodied thereon, that, when executed by a computing system having a processor and memory, cause the computing system to perform a method for generating a language model optimized for an in-domain application through a joint modeling approach, comprising:
   (a) receiving training material for training the language model, the training material including a corpus of one or more words and a predefined set of entity definitions including a weighted list of entities, wherein the predefined set of entity definitions is determined independently of the corpus of one or more words;
   (b) identifying entities that occur within the corpus of one or more words, based on the weighted list of entities;
   (c) determining the language model based on the corpus of one or more words and the weighted list of entities;
   (d) utilizing the language model to determine a set of at least two alternative parses of the corpus, each alternative parse comprising a sequence of one or more words, phrases, or entities, each sequence including the complete corpus;
   (e) determining updated weights of entities in the set of entity definitions for each of the alternative parses determined in step (d);
   (f) based on the updated weights of entities for each of the alternative parses determined in step (e), updating the language model;
   (g) determining whether the language model is satisfactory;
   (h) based on the determination of whether the language model is satisfactory:
      (i) if the language model is determined to be satisfactory, utilizing the language model for the in-domain application; and
      (ii) if the language model is determined not to be satisfactory, repeating steps (d) through (h), wherein the updated language model is utilized to determine the set of at least two alternative parses of the corpus.

2. The one or more computer storage media of claim 1, wherein the language model is determined as satisfactory where it has achieved convergence, and wherein the in-domain application comprises a computer-performed machine translation, contextual understanding, or automatic speech recognition.

3. The one or more computer storage media of claim 1, wherein the training material is determined from one or more user query logs, SMS messages, web documents, electronic libraries, books, user input libraries, or created samples.

4. The one or more computer storage media of claim 1, wherein one or more thresholds is applied to control a size of the updated language model.

5. The one or more computer storage media of claim 1, wherein determining statistical data based on the set of alternative parses includes determining a maximum-likelihood solution associated with the alternative parses.

6. A language-model training system for generating a language model optimized for a domain using a joint modeling approach comprising:
   one or more processors;
   a parsing component configured for determining a set of alternative parses comprising sequences of tokens representing a corpus of text;
   one or more computer storage media having computer-executable instructions stored thereon which, when executed by the processor, implement a method comprising:
      accessing a training corpus, the training corpus comprising a plurality of words;
      applying a first language model to determine, using the parsing component, a first set of alternative parses of the training corpus, each parse including a sequence of one or more tokens, each token comprising one or more words, phrases, or entities, at least one parse comprising a phrase token, wherein the phrase token comprises a sequence of words;
      determining a first set of statistical data associated with each alternative parse in the first set of alternative parses, wherein the first set of statistical data includes weights associated with the one or more words, phrases, or entities, and includes a weight associated with the phrase token; and
      generating a second language model based on the first set of statistical data associated with each alternative parse including the weight associated with the phrase token, wherein the sequence of words in the phrase token is encoded as an independent pseudo-word.

7. The system of claim 6, wherein generating a second language model includes determining a maximum-likelihood solution associated with the alternative parses.

8. The system of claim 6, wherein the first language model is determined from an initial set of statistical data associated with the training corpus.

9. The system of claim 6, wherein the first set of statistical data is determined based on frequency, occurrence, proximity or word distance between words or elements in the corpus or token.

10. The system of claim 6, wherein the first set of statistical data comprises probabilities associated with entity definitions.

11. The system of claim 6 wherein the method further comprises:
   applying the second language model to determine a second set of alternative parses of the training corpus;
   determining a second set of statistical data associated with the second set of alternative statistical parses; and generating a third language model based on the second set of statistical data.

12. The system of claim 6, wherein a token comprises a plurality of words, phrases, or entities, or a combination from two or more words, phrases, or entities.

13. The system of claim 6 further comprising accessing a set of entity definitions comprising a weighted list of one or more entities, and wherein determining a first set of statistical data associated with the first set of alternative parses includes determining updated weights for the set of entity definitions.

14. A method for determining, by a language model trainer implemented on one or more computing devices having a processor and a computer memory, a language model optimized for an in-domain application, the method comprising:
  receiving a training corpus comprising one or more words;
  receiving a predefined set of entity definitions that identifies particular entity types, and for each entity type includes explicitly enumerated entity instances of the entity type, wherein each entity instance is associated with a weight;
  determining a first language model based on the training corpus, the set of entity definitions, and one or more weights;
  for a number of iterations, each iteration using an iteration language model:
    (a) utilizing the iteration language model to determine a set of two or more alternative parses of the corpus, each alternative parse comprising a sequence of tokens, each token comprising one or more words, phrases, or entities;
    (b) determining updated weights for the set of entity definitions based on each alternative parse in the set of two or more alternative parses;
    (c) generating an updated language model from each alternative parse in the set of alternative parses determined in step (a) and from the updated weights determined in step (b); and
    (d) determining a language model evaluation;
  storing the updated language model in the computer memory accessible to the in-domain application;
  wherein the iteration language model is the first language model for the first iteration, and wherein the iteration language model is the updated language model determined in step (c) for each subsequent iteration; and
  wherein the number of iterations is determined based on the language model evaluation.

15. The method of claim 14, wherein evaluating the language model comprises determining that the language model has achieved convergence, and wherein the number of iterations is the number of times steps (a) through (d) are performed until the language model has achieved convergence.

16. The method of claim 14, wherein generating an updated language model comprises determining statistical data associated with the set of alternative parses and updated entity weights in the set of entity definitions.

17. The method of claim 14, wherein the training corpus is determined from one or more user query logs, SMS messages, web documents, electronic libraries, books, user input libraries, or created samples.

18. The method of claim 14, wherein one or more thresholds is applied to control a size of the updated language model.

19. The system of claim 6, wherein for each alternative parse, the one or more tokens replace the one or more words, phrases, or entities, and wherein determining the first set of statistical data associated with the first set of alternative parses comprises determining the first set of statistical data for the tokens.

* * * * *